US010315701B2

(12) United States Patent
Kim et al.

(10) Patent No.: US 10,315,701 B2
(45) Date of Patent: Jun. 11, 2019

(54) PILLAR MEMBER AND ROLL FORMED MEMBER OF VEHICLE

(71) Applicant: POSCO, Pohang-si, Gyeongsangbuk-do (KR)

(72) Inventors: Don-Gun Kim, Incheon (KR); Han-Ho Choi, Incheon (KR)

(73) Assignee: POSCO, Pohang-si, Gyeongsangbuk-do (KR)

(*) Notice: Subject to any disclaimer, the term of this patent is extended or adjusted under 35 U.S.C. 154(b) by 29 days.

(21) Appl. No.: 15/536,574

(22) PCT Filed: Dec. 22, 2015

(86) PCT No.: PCT/KR2015/014120
§ 371 (c)(1),
(2) Date: Jun. 15, 2017

(87) PCT Pub. No.: WO2016/105096
PCT Pub. Date: Jun. 30, 2016

(65) Prior Publication Data
US 2017/0327153 A1    Nov. 16, 2017

(30) Foreign Application Priority Data
Dec. 22, 2014    (KR) .................. 10-2014-0186098

(51) Int. Cl.
*B60N 99/00*    (2006.01)
*B62D 25/04*    (2006.01)
(Continued)

(52) U.S. Cl.
CPC ................ *B62D 25/04* (2013.01); *B21B 1/08* (2013.01); *B62D 21/157* (2013.01); *B62D 25/06* (2013.01);
(Continued)

(58) Field of Classification Search
CPC ...... B62D 25/04; B62D 21/157; B62D 25/06; B62D 29/007; B21B 1/08; B21B 2263/02
See application file for complete search history.

(56) References Cited

U.S. PATENT DOCUMENTS

| | | | |
|---|---|---|---|
| 6,293,617 B1* | 9/2001 | Sukegawa ............ | B62D 25/025 296/203.02 |
| 9,415,810 B2* | 8/2016 | Faruque ............... | B62D 27/023 |

(Continued)

FOREIGN PATENT DOCUMENTS

| | | |
|---|---|---|
| DE | 102011052291 A1 | 1/2013 |
| EP | 1918177 A1 | 5/2008 |

(Continued)

OTHER PUBLICATIONS

Extended European Search Report dated Dec. 15, 2017 issued in European Patent Application No. 15873623.1.

(Continued)

*Primary Examiner* — Lori L Lyjak
(74) *Attorney, Agent, or Firm* — Morgan Lewis & Bockius LLP

(57) ABSTRACT

The present invention provides a pillar member of a vehicle, which is characterized by comprising: a pillar main body portion; and a connecting and joining portion provided on both ends of the pillar main body portion and coupled to a vehicle body. The pillar main body portion and the connecting and joining portion are consecutively formed. The connecting and joining portion includes: a first connecting and joining portion provided on one side of the pillar main body portion; and a second connecting and joining portion provided on the other side of the pillar main body portion so as to face the first connecting and joining portion. The pillar main body portion is consecutively formed through a roll forming technique in a region between the first connecting
(Continued)

(a)

(b)

and joining portion and the second connecting and joining portion, and has an odd number of closed cross section portions formed therein.

16 Claims, 16 Drawing Sheets

(51) Int. Cl.
    *B62D 25/06*     (2006.01)
    *B21B 1/08*     (2006.01)
    *B62D 21/15*     (2006.01)
    *B62D 29/00*     (2006.01)

(52) U.S. Cl.
    CPC ........ *B62D 29/007* (2013.01); *B21B 2263/02* (2013.01)

(56) References Cited

U.S. PATENT DOCUMENTS

| | | | |
|---|---|---|---|
| 2008/0052908 A1 | 3/2008 | Reed et al. | |
| 2008/0238151 A1* | 10/2008 | Nakamura | B62D 25/04 296/203.03 |
| 2010/0244491 A1 | 9/2010 | Baudart | |
| 2015/0183471 A1* | 7/2015 | Faruque | B62D 27/023 29/897.2 |

FOREIGN PATENT DOCUMENTS

| | | | |
|---|---|---|---|
| JP | H07-172344 A | 7/1995 |
| JP | 08-011744 A | 1/1996 |
| JP | H11-291941 A | 10/1999 |
| JP | 2005-199738 A | 7/2005 |
| JP | 2008-110719 A | 5/2008 |
| JP | 2008-195223 A | 8/2008 |
| JP | 2008-230453 A | 10/2008 |
| JP | 2011-202195 A | 10/2011 |
| KR | 2014-0088920 A | 7/2014 |

OTHER PUBLICATIONS

Japanese Office Action dated Jun. 19, 2018 issued in Japanese Patent Application No. 2017-533391 (with English translation).
International Search Report dated Mar. 29, 2016 issued in International Patent Application No. PCT/KR2015/014120 (with English translation).
Chinese Office Action dated Sep. 30, 2018 issued in Chinese Patent Application No. 201580069881.5 (with English translation).
Japanese Office Action dated Mar. 5, 2019 issued in Japanese Patent Application No. 2017-533391.

* cited by examiner

【Figure 1】
(a)
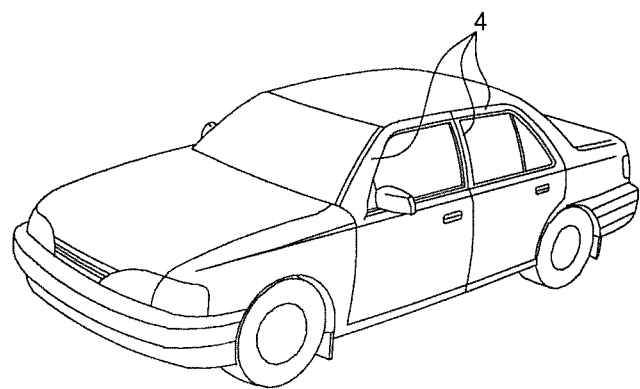
(b)
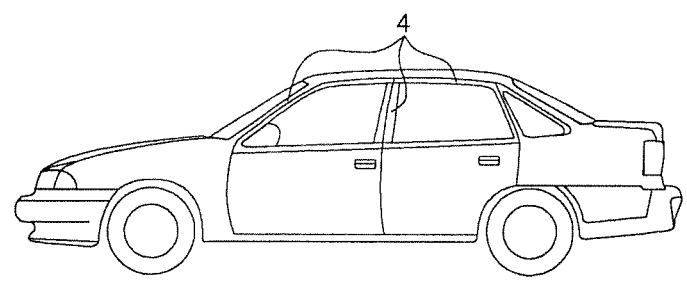

【Figure 2】
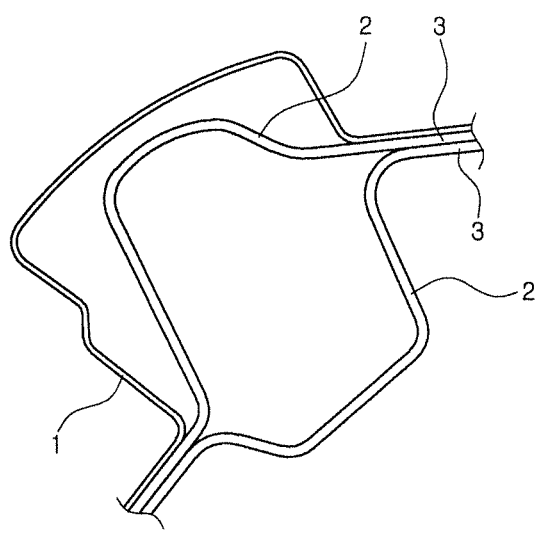

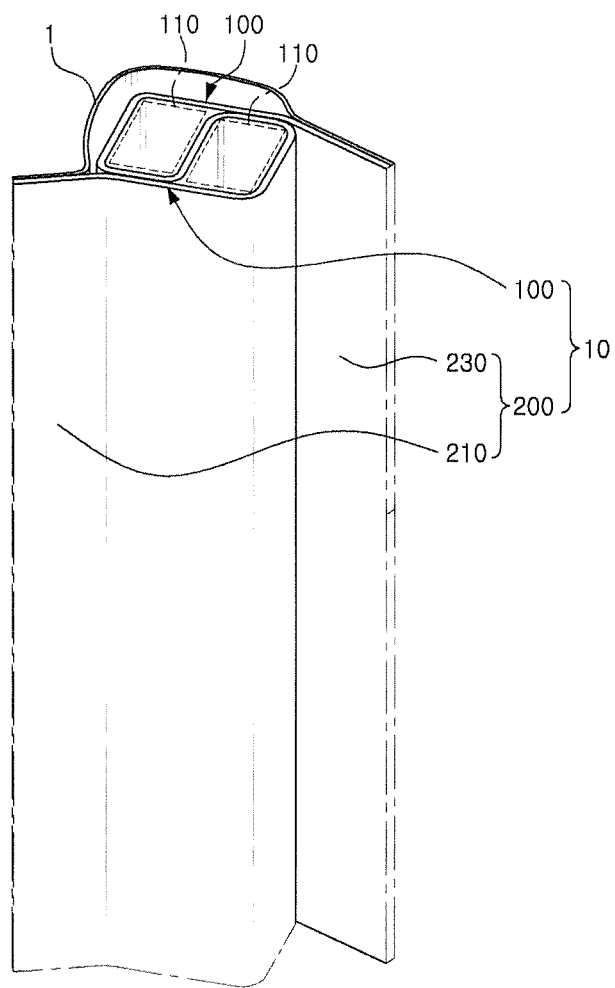
[Figure 3]

【Figure 4】
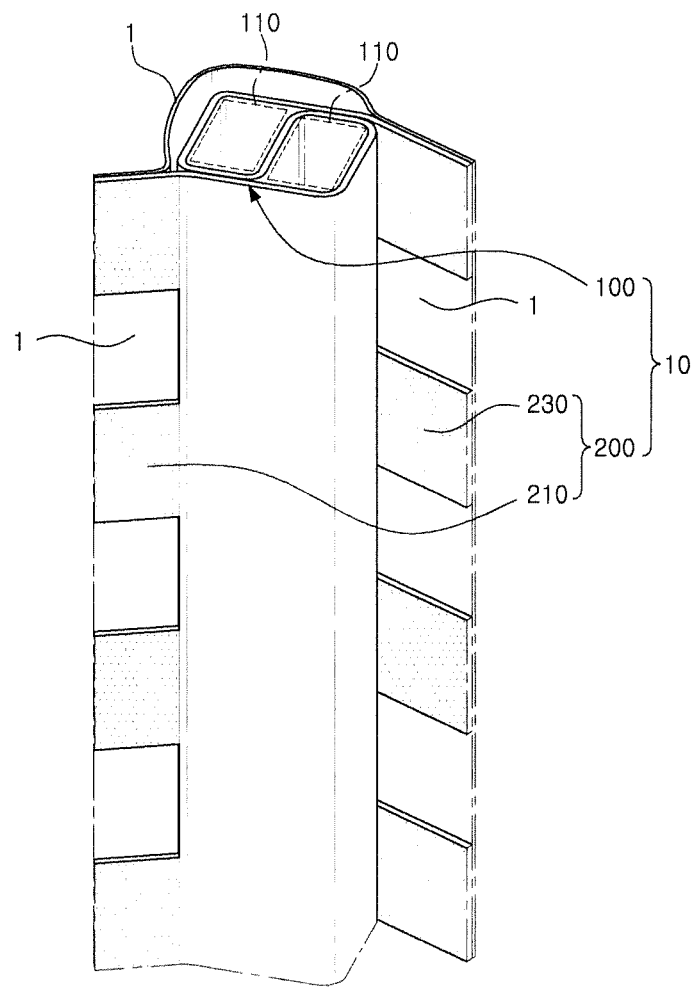

[Figure 5]
(a)
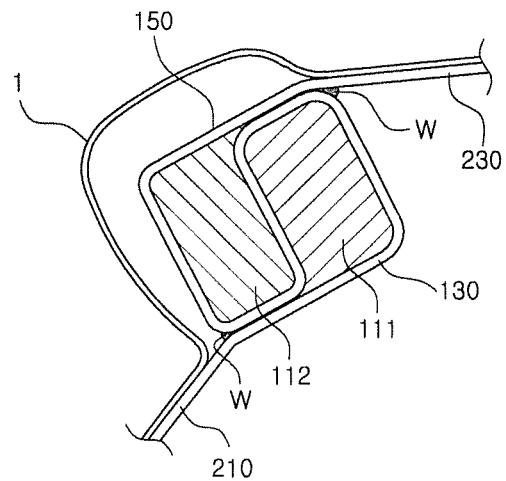
(b)
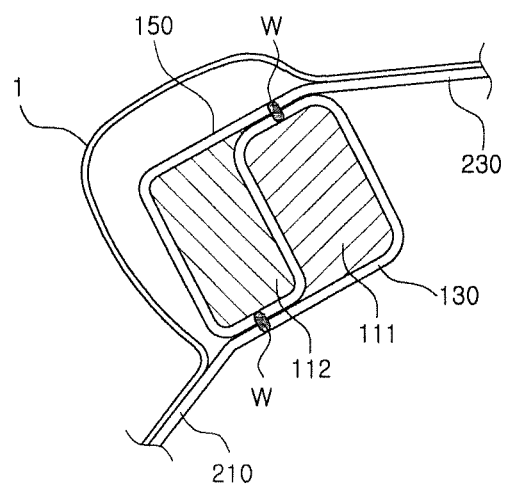

[Figure 6]
(a)
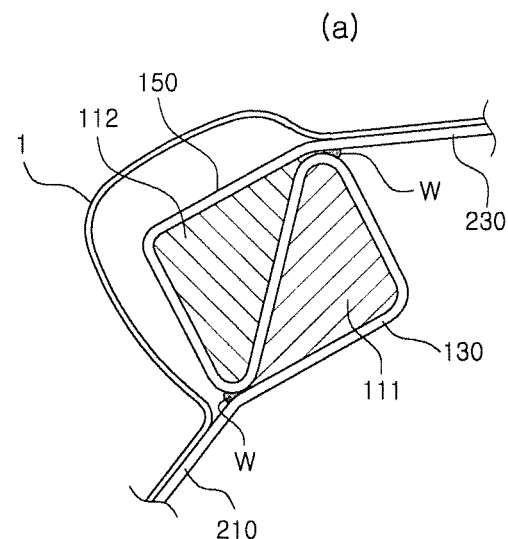
(b)
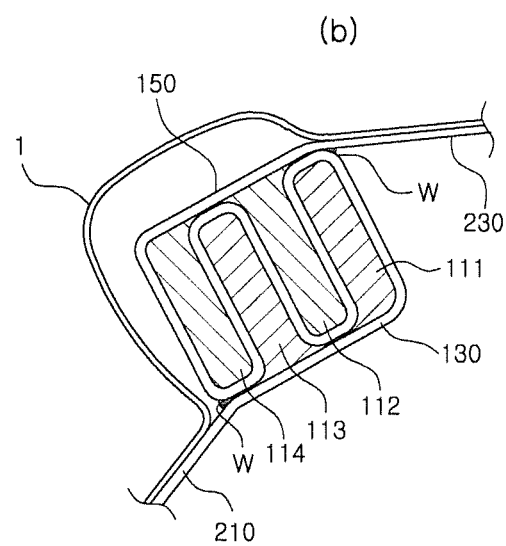

[Figure 7a]
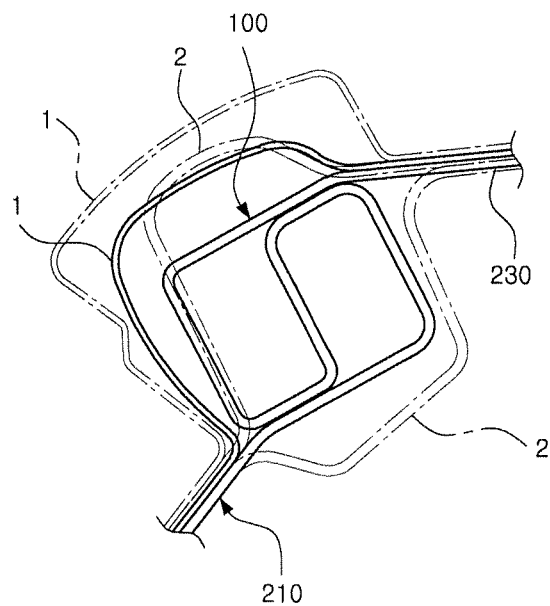
[Figure 7b]
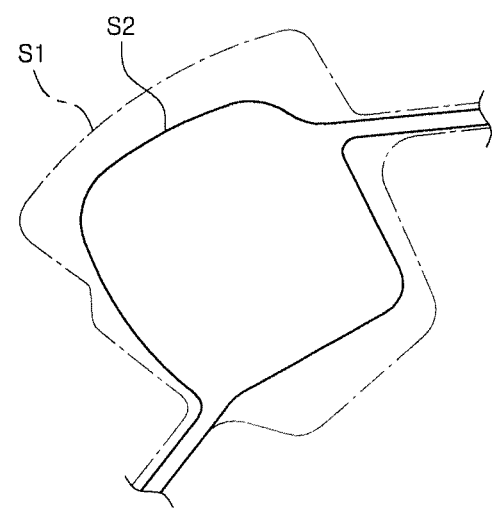

[Figure 7c]
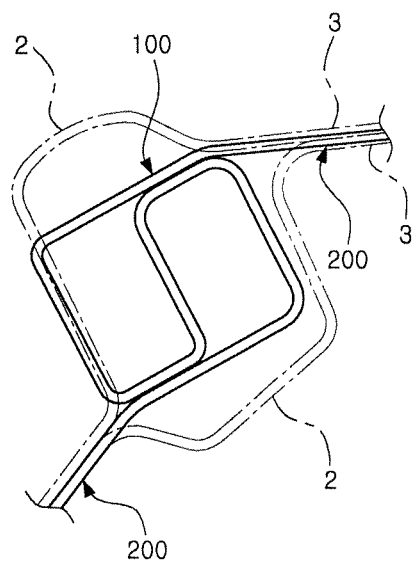
[Figure 8]
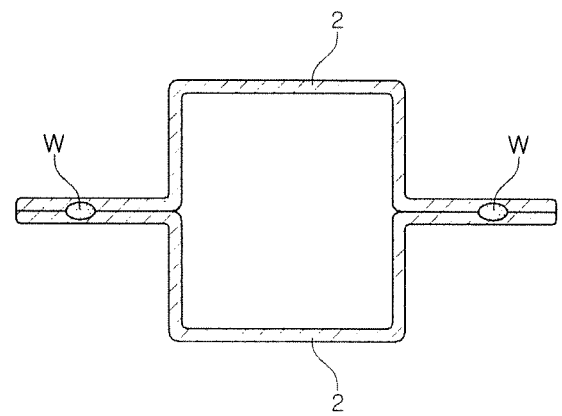

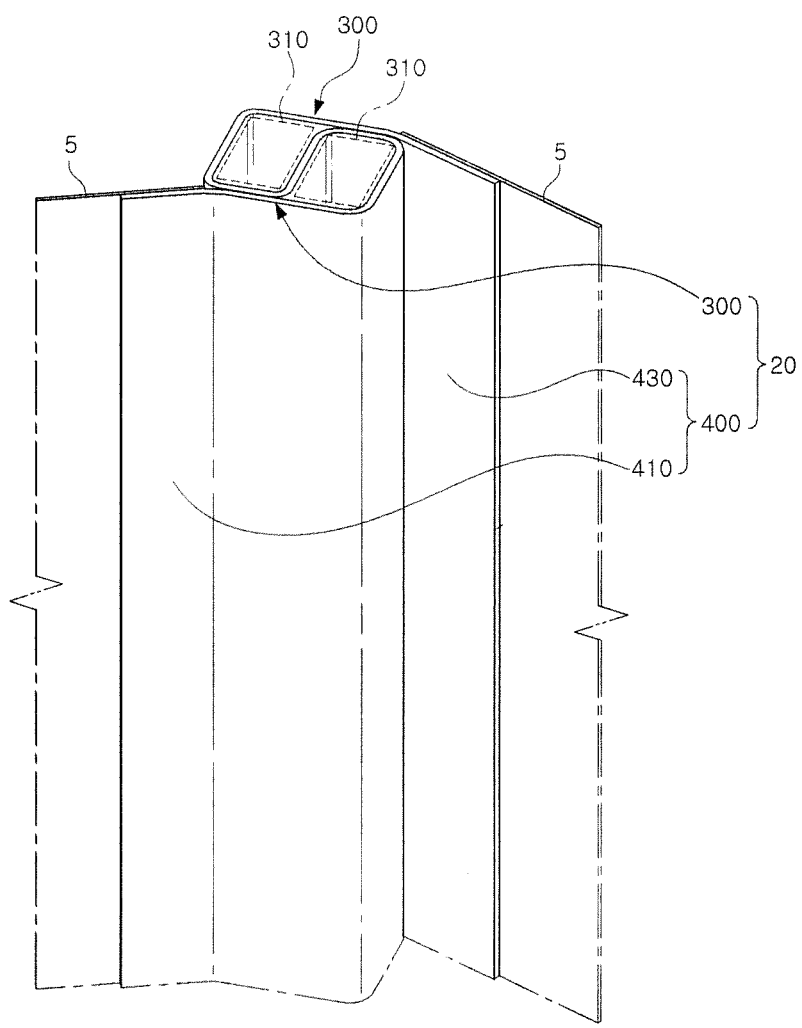
[Figure 9]

[Figure 10]
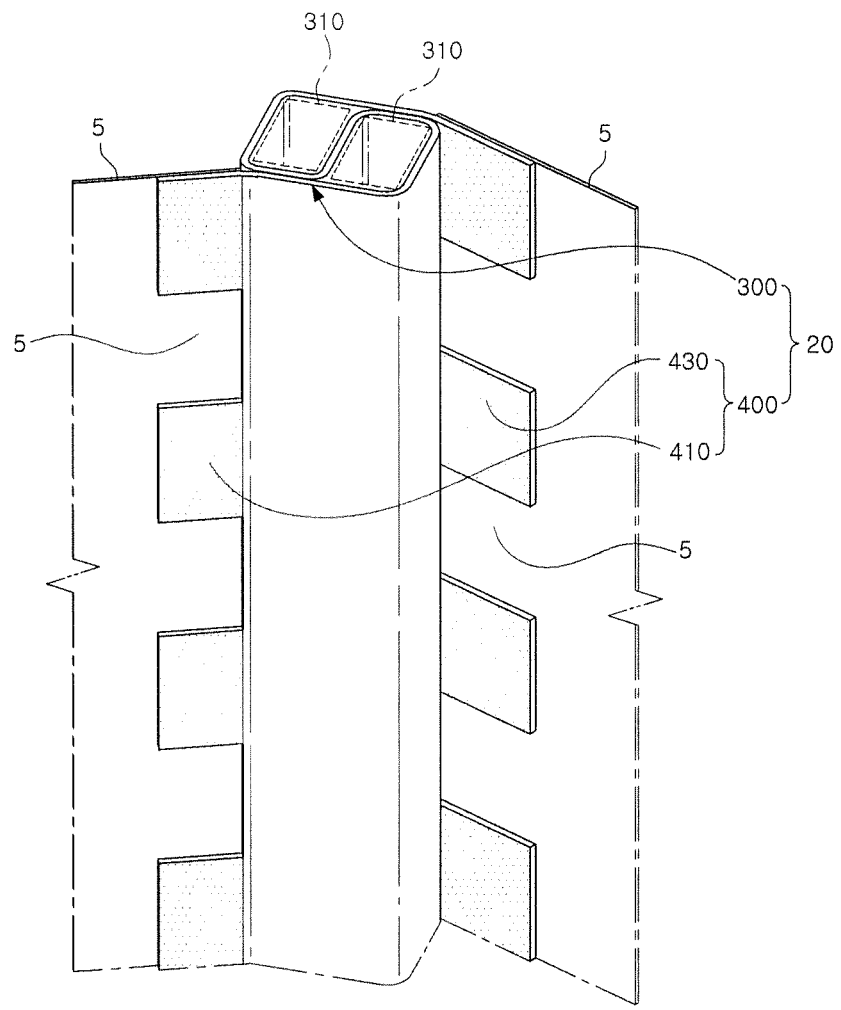

[Figure 11]
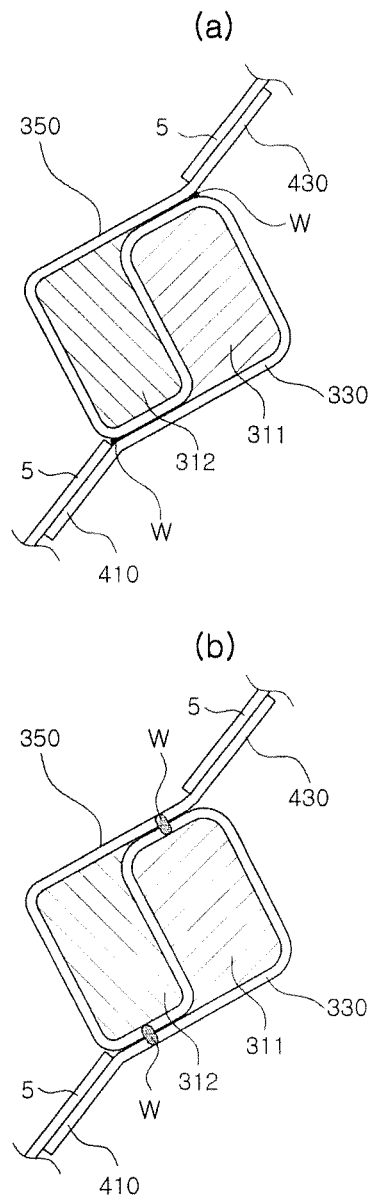

[Figure 12]
(a)
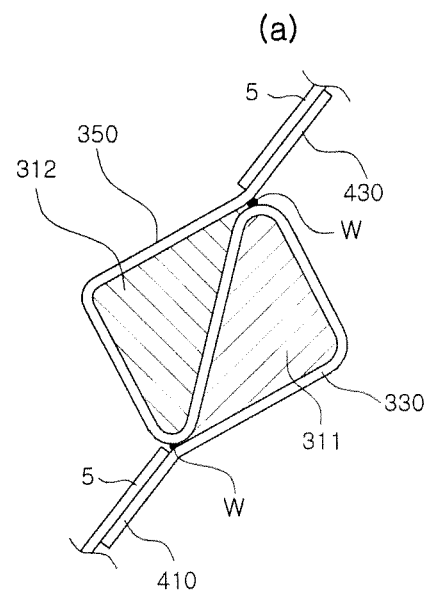
(b)
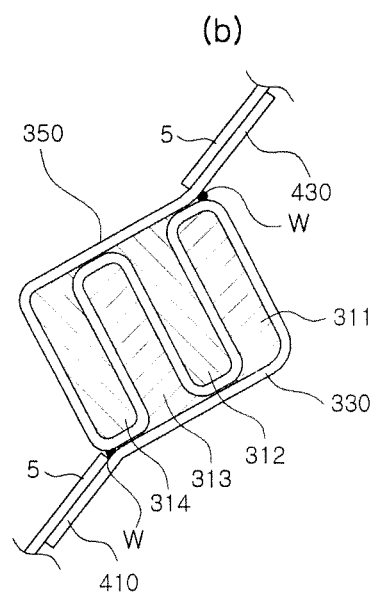

[Figure 13]
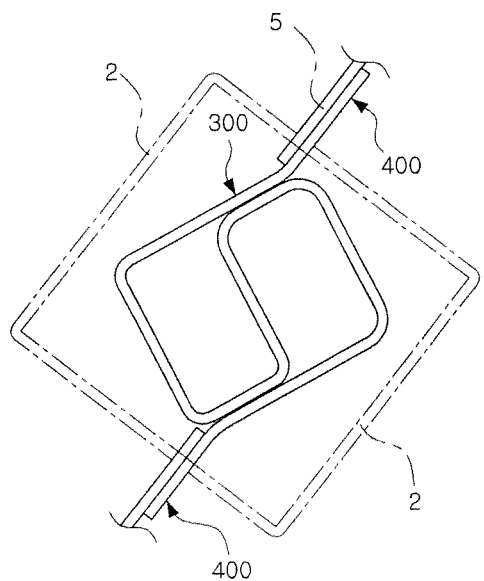
[Figure 14]
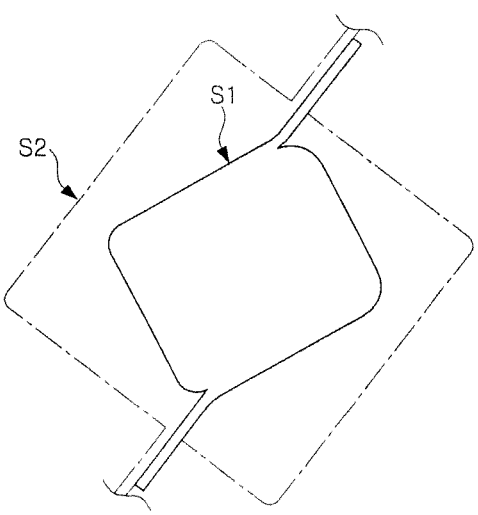

[Figure 15]
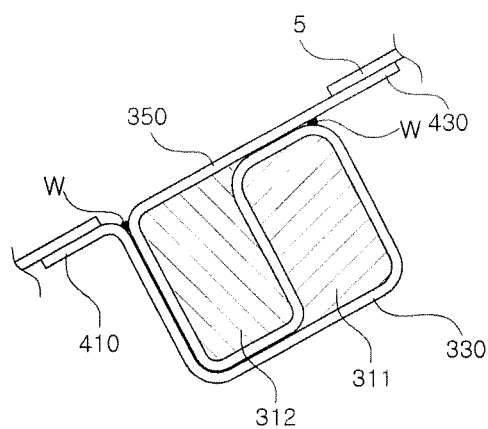
[Figure 16]
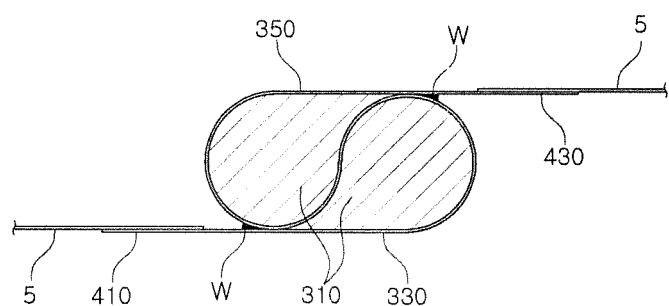

[Figure 17]
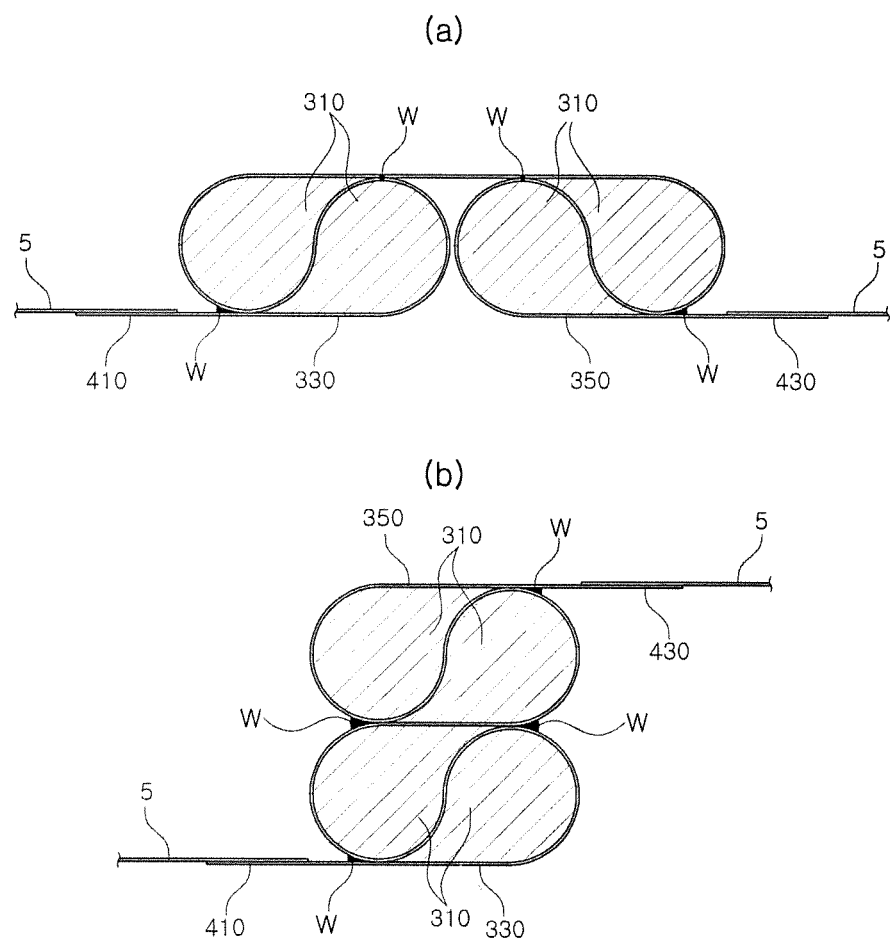

[Figure 18]
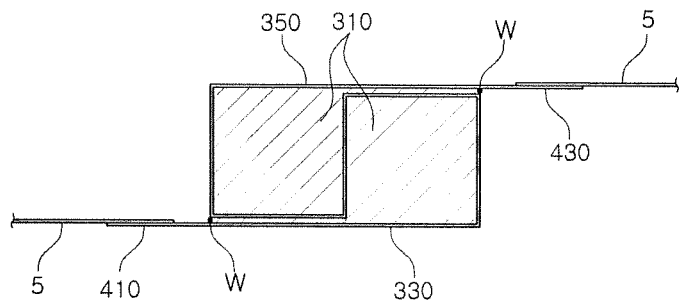
[Figure 19]
(a)
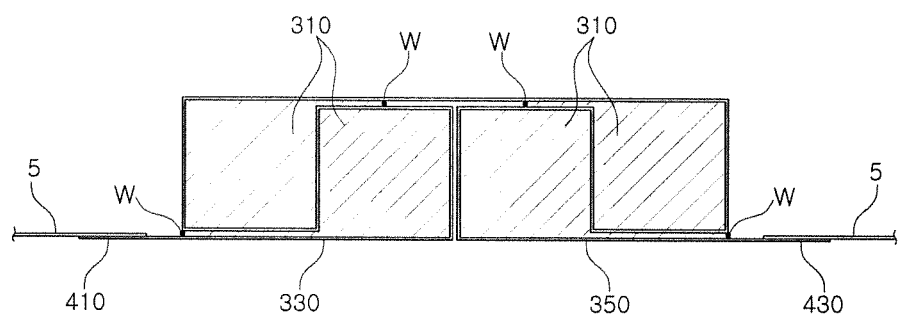
(b)
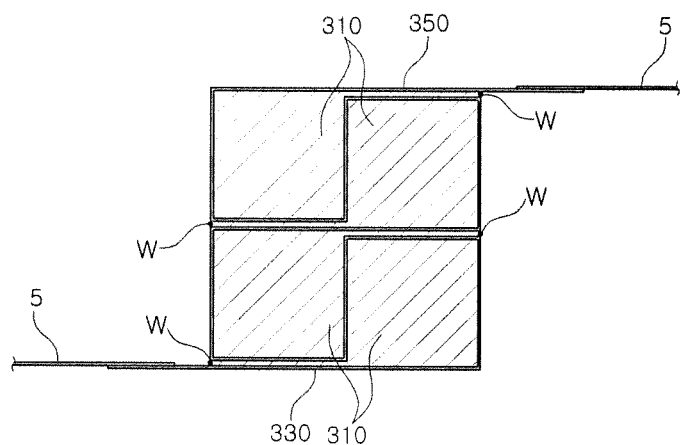

PILLAR MEMBER AND ROLL FORMED MEMBER OF VEHICLE

CROSS REFERENCE

This patent application is the U.S. National Phase under 35 U.S.C. § 371 of International Application No. PCT/KR2015/014120, filed on Dec. 22, 2015, which claims the benefit of Korean Patent Application No. 10-2014-086098, filed on Dec. 22, 2014, the entire contents of each are hereby incorporated by reference.

TECHNICAL FIELD

The present disclosure relates to a pillar member and a roll formed member of a vehicle, having relatively high strength at low cost.

BACKGROUND ART

Descriptions provided hereinafter are merely background information relating to the present disclosure, but are not related to the related art.

Pillar members of vehicles are provided as members supporting the roof of a vehicle and as structural members of a vehicle directly affecting the safety of a driver when a vehicle is overturned.

As illustrated in FIG. 1, pillar members may be disposed to be connected to a roof of a vehicle. In addition, pillar members may be disposed between a windshield and a side window of a vehicle, between a front door and a rear door on a side thereof, between the rear door and a rear window, or the like.

As collision regulations have been tightened in terms of the safety of vehicles, the requirements for load bearing performance of pillar members have gradually become stricter. Thus, high strength is required in pillar members.

However, as illustrated in FIG. 2, in the case of pillar members of the related art, pillar members having closed cross-sectional portions are formed in such a manner that two press members are cast in an interior of an outer panel forming a vehicle body of a vehicle, and welding flanges formed on opposing end portions of press members are bonded by welding.

As such, in a case in which pillar members are manufactured using a pressing method of the related art, a cross section of pillar members may be significantly large, in order to secure sufficient load bearing performance.

In detail, in a case in which pillar members of the related art are applied to pillar members formed between the windshield and the side window, driver visibility may be obstructed by pillar members having a cross section, an area of which has been increased, thereby causing traffic accidents.

In addition, giga-class ultra-high strength steel may not be cast using a press casting method of the related art.

Thus, a suggestion for manufacturing ultra-high strength steel using a method, such as a hot press forming (HPF) method, has been considered, but the HPF method has a problem in which manufacturing expenses are significantly increased.

Thus, it is required to consider manufacturing structural members using a roll forming method in which the degree of size precision is high, substantially no scrapping and wear of a roll occurs, thereby significantly economically manufacturing products having a uniform cross section shape and a relatively long length.

DISCLOSURE

Technical Problem

An aspect of the present disclosure may provide a pillar member and a roll formed member having improved load bearing performance and reduced manufacturing expenses by applying a closed cross section structure thereto.

An aspect of the present disclosure may provide a pillar member and a roll formed member reducing costs by minimizing usage of a steel plate and easily combined with a vehicle frame and a structural member.

Technical Solution

According to an aspect of the present disclosure, a pillar member of a vehicle comprises a pillar body portion having at least one closed cross-sectional portion and a connection bonding portion disposed on opposing side surfaces of the pillar body portion and combined with a vehicle frame. The pillar body portion and the connection bonding portion are consecutively cast. The connection bonding portion comprises a first connection bonding portion disposed on one side of the pillar body portion and a second connection bonding portion disposed on the other side of the pillar body portion to oppose the first connection bonding portion. The pillar body portion is consecutively cast using a roll forming method in a section between the first connection bonding portion and the second connection bonding portion, thereby forming an even number of closed cross-sectional portions.

According to another aspect of the present disclosure, a pillar member of a vehicle comprises a pillar body portion having at least one closed cross-sectional portion and a connection bonding portion disposed on opposing side surfaces of the pillar body portion and combined with a vehicle frame. The pillar body portion and the connection bonding portion are consecutively cast. The connection bonding portion comprises a first connection bonding portion disposed on one side of the pillar body portion and a second connection bonding portion disposed on the other side of the pillar body portion to oppose the first connection bonding portion. The pillar body portion is consecutively cast in a section between the first connection bonding portion and the second connection bonding portion using a roll forming method to comprise a first closed cross-sectional portion and a second closed cross-sectional portion, having a FIG. 8 type cross section.

According to another aspect of the present disclosure, a pillar member of a vehicle comprises a pillar body portion having at least one closed cross-sectional portion and a connection bonding portion disposed on opposing side surfaces of the pillar body portion and combined with a vehicle frame. The pillar body portion and the connection bonding portion are consecutively cast. The connection bonding portion comprises a first connection bonding portion disposed on one side of the pillar body portion and a second connection bonding portion disposed on the other side of the pillar body portion to oppose the first connection bonding portion. The pillar body portion comprises a first body portion panel formed to be extended from the first connection bonding portion, a second body portion panel formed to be extended from the second connection bonding portion, a first closed cross-sectional portion formed between the first body portion panel and the second body portion panel to be connected thereto and consecutively roll formed after the first body portion panel, and a second closed cross-sectional portion having one side connected to the first closed cross-sectional portion and the other side connected to the second connection bonding portion to be consecutively roll formed.

Among portions of the first body portion panel and the second body portion panel overlapping a member forming the first closed cross-sectional portion and the second closed cross-sectional portion, at least two portions may be lap welded.

The connection bonding portion may be welded to the at least one closed cross-sectional portion disposed closest to the connection bonding portion.

At least the pillar body portion between the pillar body portion and the connection bonding portion may be configured using a material selected from among martensitic steel, complex phase (CP) steel, dual phase (DP) steel, transformation induced plasticity (TRIP) steel, and twinning induced plasticity (TWIP) steel, having strength of 980 MPa or higher.

According to another aspect of the present disclosure, a pillar member of a vehicle comprises a pillar body portion having at least one closed cross-sectional portion and a connection bonding portion disposed on opposing side surfaces of the pillar body portion and combined with a vehicle frame. The pillar body portion and the connection bonding portion are consecutively cast. The pillar body portion and the connection bonding portion are consecutively cast using a single roll forming process.

The pillar member of a vehicle comprises the pillar body portion having a multiple-closed cross-sectional structure including a plurality of closed cross-sectional portions formed to have a triangular cross-sectional shape or a quadrangular cross-sectional shape.

The connection bonding portion may be disposed on a portion of opposing side surfaces of the pillar body portion in a length direction.

The pillar body portion and the connection bonding portion may be formed at an interface between a windshield and a side window of the vehicle frame in a length direction.

According to an aspect of the present disclosure, a roll formed member comprises a roll formed body portion having at least one closed cross-sectional portion and a connection bonding portion disposed on at least one side of the roll faulted body portion and combined with a structural member. The roll formed body portion and the connection bonding portion are integrally cast using a roll forming method.

The connection bonding portion may include a first connection bonding portion disposed on one side of the roll formed body portion and a second connection bonding portion disposed on the other side of the roll formed body portion to oppose the first connection bonding portion.

The roll formed body portion may be consecutively cast in a section between the first connection bonding portion and the second connection bonding portion using the roll forming method, in order to form an even number of closed cross-sectional portions.

The roll formed body portion may be consecutively cast in a section between the first connection bonding portion and the second connection bonding portion using the roll forming method, in order to provide a first closed cross-sectional portion and a second closed cross-sectional portion, having a FIG. 8 type cross section.

The roll formed body portion may include a first body portion panel formed to be extended from the first connection bonding portion, a second body portion panel formed to be extended from the second connection bonding portion, a first closed cross-sectional portion connected to the first body portion panel and consecutively roll formed, and a second closed cross-sectional portion having one side connected to the first closed cross-sectional portion and the other side connected to the second body portion panel and consecutively roll formed.

Among portions of the first body portion panel and the second body portion panel overlapping a member forming the first closed cross-sectional portion and the second closed cross-sectional portion, at least two portions may be lap welded.

The connection bonding portion may be welded to the at least one closed cross-sectional portion disposed closest to the connection bonding portion.

At least the roll formed body portion between the roll formed body portion and the connection bonding portion may be configured using a material selected from among martensitic steel, complex phase (CP) steel, dual phase (DP) steel, transformation induced plasticity (TRIP) steel, and twinning induced plasticity (TWIP) steel, having strength of 980 MPa or higher.

The roll formed body portion and the connection bonding portion may be consecutively cast using a single roll forming process.

The roll formed member comprises the roll formed body portion having a multiple-closed cross-sectional structure including a plurality of closed cross-sectional portions formed to have a triangular cross-sectional shape or a quadrangular cross-sectional shape.

The connection bonding portion may be formed on a portion of opposing side surfaces of the roll formed body portion in a length direction.

Advantageous Effects

According to an aspect of the present disclosure, load bearing performance may be improved by applying a closed cross-sectional structure, production rates of a pillar member and a roll formed member may be increased by reducing usage of steel and an amount of welding, and manufacturing expenses may be decreased by reducing the usage of steel and the amount of welding.

According to an aspect of the present disclosure, manufacturing expenses may be reduced in such a manner that a closed cross-sectional structure is formed to improve load bearing performance of a pillar member and a roll formed member, and a manufacturing process is streamlined, simultaneously, by consecutively casting the pillar member and the roll formed member using a roll forming process.

DESCRIPTION OF DRAWINGS

FIG. 1 is a view illustrating a state in which a pillar member is disposed in a vehicle.

FIG. 2 is a view of a pillar member of a vehicle of the related art, formed in such a manner that two press members are welded together.

FIG. 3 is a perspective view of a pillar member of a vehicle according to an exemplary embodiment in the present disclosure.

FIG. 4 is a perspective view of a pillar member of a vehicle according to another exemplary embodiment.

FIG. 5 is a cross-sectional view of a pillar member of a vehicle according to an exemplary embodiment.

FIG. 6 is a cross-sectional view of a pillar member of a vehicle according to another exemplary embodiment.

FIG. 7A is a view contrasting a cross section of the pillar member combined with a vehicle frame of the related art illustrated in FIG. 2 and a cross section of the pillar member combined with a vehicle frame of the present disclosure illustrated in FIG. 5.

FIG. 7B is a view contrasting a disposition area of the pillar member combined with the vehicle frame of the related art illustrated in FIG. 2 and a disposition area of the pillar member combined with the vehicle frame of the present disclosure illustrated in FIG. 5.

FIG. 7C is a view contrasting a cross section of the pillar member of the vehicle of the related art illustrated in FIG. 2 and a cross section of the pillar member of the vehicle of the present disclosure illustrated in FIG. 5.

FIG. 8 is a view of a roll formed member of the related art.

FIG. 9 is a perspective view of a roll formed member according to an exemplary embodiment.

FIG. 10 is a perspective view of a roll formed member according to another exemplary embodiment.

FIG. 11 is a cross-sectional view of a roll formed member according to an exemplary embodiment.

FIG. 12 is a cross-sectional view of a roll formed member according to another exemplary embodiment.

FIG. 13 is a view contrasting a cross section of the roll formed member of the related art illustrated in FIG. 8 and a cross section of the roll formed member of the present disclosure illustrated in FIG. 11.

FIG. 14 is a view contrasting the cross section of the roll formed member of the related art illustrated in FIG. 8 and a disposition area of the roll formed member of the present disclosure illustrated in FIG. 11.

FIG. 15 is a view of a cross-sectional view of a roll formed member according to another exemplary embodiment.

FIGS. 16 to 19 are views of a roll formed member of the present disclosure having various exemplary embodiments.

BEST MODE FOR INVENTION

Hereinafter, examples of the present disclosure will be described in detail with reference to the accompanying drawings. The disclosure may, however, be exemplified in many different forms and should not be construed as being limited to the specific embodiments set forth herein, and those skilled in the art and understanding the present disclosure can easily accomplish retrogressive inventions or other embodiments included in the scope of the present disclosure by the addition, modification, and removal of components within the same scope, but those are construed as being included in the scope of the present disclosure. Like reference numerals will be used to designate like components having similar functions throughout the drawings within the scope of the present disclosure.

Hereinafter, a pillar member 10 of a vehicle according to an exemplary embodiment in the present disclosure will be described in detail with reference to the attached drawings.

With reference to FIGS. 1 to 7C, the pillar member 10 according to an exemplary embodiment may include a pillar body portion 100 and a connection bonding portion 200.

As illustrated in FIG. 3, the pillar member 10 may comprise the pillar body portion 100 including at least one closed cross-sectional portion 110 and the connection bonding portions 200 disposed on opposing side surfaces of the pillar body portion 100 and combined with a vehicle frame 1. In addition, the pillar body portion 100 and the connection bonding portion 200 may be consecutively cast.

The pillar body portion 100 and the connection bonding portion 200, forming the pillar member 10, may be cast to be members having a desired form in such a manner that a steel plate is folded by a roll forming device to have a multistage cross section.

As illustrated in FIGS. 3 and 4, the pillar body portion 100 and the connection bonding portion 200 may be consecutively cast using a single roll forming process.

In FIG. 4, in a state in which opposing sides of a panel, such as a steel plate, or the like, forming the pillar body portion 100 and the connection bonding portion 200 are cut in advance, and the connection bonding portion 200 is partially formed, the pillar member 10 and the connection bonding portion 200 may be consecutively cast using the single roll forming process.

Without a disconnection in the steel plate, a first connection bonding portion 210, the pillar body portion 100, and a second connection bonding portion 230 are sequentially roll formed, thereby being consecutively cast using the single roll forming process.

The roll forming process allows for a relatively high degree of size precision and results in substantially no scrapping and wear of a roll, thereby significantly economically manufacturing products having a uniform cross section shape and a relatively long length.

The roll forming process is a technology in which whenever a set of upper and lower multistage stationary rotating rolls are arranged, and a coil or a material that has been cut passes between each set of rotating rolls, a component is gradually cast to have a form in which a cross section thereof is uniform and a length thereof is relatively long.

In detail, since ultra-high strength steel may be cast, the roll forming process is suitable to manufacture a high strength steel component of a vehicle.

As illustrated in FIGS. 3 and 4, the connection bonding portion 200 may include the first connection bonding portion 210 and the second connection bonding portion 230.

The connection bonding portion 200 may include the first connection bonding portion 210 disposed on one side of the pillar body portion 100 and the second connection bonding portion 230 disposed on the other side of the pillar body portion 100 to oppose the first connection bonding portion 210.

The pillar body portion 100 may be consecutively cast in a section between the first connection bonding portion 210 and the second connection bonding portion 230 using a roll forming method, thereby forming an even number of closed cross-sectional portions 110.

A closed cross-sectional portion 110 formed in the pillar body portion 100 may be provided as an even number of closed cross-sectional portions, so that the pillar body portion 100 and the connection bonding portion 200 may be integrally cast using the single roll forming process.

As illustrated in FIGS. 5 to 6, in order that the pillar body portion 100 and the connection bonding portion 200 are integrally roll formed, and the connection bonding portion 200 is formed on the opposing side surfaces of the pillar body portion 100, the closed cross-sectional portion 110 may be provided as an even number of closed cross-sectional portions.

In a case in which an odd number of closed cross-sectional portions 110 are consecutively formed in the pillar body portion 100, the connection bonding portions 200 may not be formed on opposing side surfaces of the pillar body portion 100 to oppose each other, and may be formed in the same direction.

Thus, in order that two connection bonding portions 200 opposing each other to be combined with the vehicle frame 1 are formed in the pillar body portion 100, and the connection bonding portion 200 and the pillar body portion 100 are integrally cast using the single roll forming process, the closed cross-sectional portion 110 may be provided as an even number of closed cross-sectional portions.

The pillar member 10 according to an exemplary embodiment may form the pillar body portion 100 having a closed cross-sectional structure. The connection bonding portions 200 opposing each other to be connected to the vehicle frame 1 on opposing side surfaces of the pillar body portion 100 may be cast using the single roll forming process.

Thus, the pillar member 10 according to an exemplary embodiment may improve load bearing performance by having a closed cross-sectional structure, may increase a production rate of the pillar member 10 by reducing an amount of welding, and may reduce manufacturing expenses of the pillar member 10 due to a reduction in the amount of welding.

In addition, in the case of the pillar member 10 according to an exemplary embodiment, manufacturing expenses maybe reduced, and the vehicle frame 1 maybe easily combined therewith by minimizing usage of a steel plate used to manufacture the pillar member 10, in such a manner that the closed cross-sectional structure to improve load bearing performance is formed, and the connection bonding portions 200 opposing each other are formed on the opposing side surfaces of the pillar body portion 100.

The pillar body portion 100 may form a figure-8 type cross section in which two closed cross-sectional portions 110 are consecutively formed using the roll forming method.

As illustrated in FIG. 5A, the pillar body portion 100 may be consecutively cast in the section between the first connection bonding portion 210 and the second connection bonding portion 230 using the roll forming method, thereby including a first closed cross-sectional portion 111 and a second closed cross-sectional portion 112, having the FIG. 8 type cross section.

As illustrated in FIG. 5A, in order to bond the first connection bonding portion 210, the pillar body portion 100, and the second connection bonding portion 230, consecutively roll formed, the first connection bonding portion 210, the pillar body portion 100, and the second connection body portion may be bonded by welding at two points.

As such, the pillar body portion 100 having a multiple-closed cross-sectional structure including two or more closed cross-sectional portions 110 may be formed, and the connection bonding portions 200 opposing each other may be formed on the opposing side surfaces of the pillar body portion 100 in such a manner that, in order to bond the first connection bonding portion 210, the pillar body portion 100, and the second connection bonding portion 230, consecutively roll formed, the first connection bonding portion 210, the pillar body portion 100, and the second connection bonding portion 230 are bonded by welding at two points.

Thus, the pillar member 10 according to an exemplary embodiment may improve load bearing performance by having the multiple-closed cross-sectional structure, may increase a production rate of the pillar member 10 by reducing the amount of welding, and may reduce the manufacturing expenses of the pillar member 10 due to the reduction in the amount of welding.

In addition, in the case of the pillar member 10 according to an exemplary embodiment, the manufacturing expenses may be reduced, and the vehicle frame 1 may be easily combined therewith by minimizing the usage of the steel plate used to manufacture the pillar member 10, in such a manner that the multiple-closed cross-sectional structure to improve load bearing performance is formed, and the connection bonding portions 200 opposing each other are formed on the opposing side surfaces of the pillar body portion 100.

As illustrated in FIGS. 5 and 6, the pillar body portion 100 may include a first body portion panel 130, a second body portion panel 150, the first closed cross-sectional portion 111, and the second closed cross-sectional portion 112.

The connection bonding portion 200 may include the first connection bonding portion 210 provided on one side surface of the pillar body portion 100 and the second connection bonding portion 230 provided on the other side surface of the pillar body portion 100. The pillar body portion 100 may include the first body portion panel 130 formed to be extended from the first connection bonding portion 210, the second body portion panel 150 formed to be extended from the second connection bonding portion 230, the first closed cross-sectional portion 111 formed between the first body portion panel 130 and the second body portion panel 150 to be connected thereto and consecutively roll formed in the first body portion panel 130, and the second closed cross-sectional portion 112 having one side connected to the first closed cross-sectional portion 111 and the other side connected to the second connection bonding portion 230 and consecutively roll formed.

The pillar body portion 100 may include the first body portion panel 130 formed to be extended from the first connection bonding portion 210, the second body portion panel 150 formed to be extended from the second connection bonding portion 230, the first closed cross-sectional portion 111 consecutively roll formed to be connected to the first body portion panel 130, and the second closed cross-sectional portion 112 having one side connected to the first closed cross-sectional portion 111 and the other side connected to the second body portion panel 150 and consecutively roll formed.

A first closed cross-sectional portion 311 and a second closed cross-sectional portion 312 may be formed between a first body portion panel 330 and a second body portion panel 350 to be connected thereto and may be consecutively roll formed.

The pillar body portion 100 may form a multiple-closed cross-sectional structure including a plurality of closed cross-sectional portions 110 formed to have a triangular cross-sectional shape or a quadrangular cross-sectional shape.

As illustrated in FIG. 5, the first closed cross-sectional portion 111 and the second closed cross-sectional portion 112 may be formed to have a quadrangular cross-sectional shape, corners of which may have a predetermined curvature.

As illustrated in FIG. 6A, the first closed cross-sectional portion 111 and the second closed cross-sectional portion 112 may be formed to have a triangular cross-sectional shape, corners of which may have a predetermined curvature.

However, a shape of the closed cross-sectional portion 110 is not limited to being triangular or quadrangular. The closed cross-sectional portion 110 may have any type of polygonal cross section that may improve load bearing performance of the pillar member 10.

As illustrated in FIG. 6B, the first closed cross-sectional portion 111, the second closed cross-sectional portion 112, a third closed cross-sectional portion 113, and a fourth closed cross-sectional portion 114 may be formed to have a quadrangular cross-sectional shape, corners of which may have a predetermined curvature.

In FIG. 6A, two closed cross-sectional portions 110 are formed, while, in FIG. 6B, four closed cross-sectional portions 110 are formed. FIGS. 6A and 6B have a difference in load bearing performance of the pillar member 10 and manufacturing expenses depending on usage of steel, or the like.

FIG. 6A illustrates a form of an optimal pillar member 10 according to an exemplary embodiment securing sufficient load bearing performance by forming a multiple-closed cross-sectional structure including two closed cross-sectional portions 110 and reducing the manufacturing expenses of the pillar member 10 by minimizing the usage of steel and the amount of welding.

In the meantime, in FIG. 6B, a multiple-closed cross-sectional structure is formed by forming four closed cross-sectional portions 110, thereby increasing manufacturing expenses, as compared with the case in FIG. 6A, due to an increase in the usage of steel, but load bearing performance is improved.

In the case of FIG. 6B, there is substantially no change in an area of cross sections of the pillar member 10 and the vehicle frame 1. Thus, FIG. 6A and FIG. 6B have no significant difference in terms of securing driver visibility.

Thus, in the case of a vehicle requiring sufficient load bearing performance in terms of structural stability of a vehicle, such as an emergency vehicle, the pillar member 10 illustrated in FIG. 6B may be applied thereto.

As illustrated in FIG. 5B, in the case of the pillar member 10, at least two portions among portions of a body portion panel overlapping a member forming the closed cross-sectional portion 110 may be lap welded.

A portion in which the first body portion panel 130 overlaps a member of the second closed cross-sectional portion 112 and a portion in which the second body portion panel 150 overlaps a member of the first closed cross-sectional portion 111 may be lap welded.

As illustrated in FIGS. 5A, 6A, and 6B, the connection bonding portion 200 may be bonded by welding to the closed cross-sectional portion 110 disposed closest to the connection bonding portion 200. In other words, the closed cross-sectional portion 110 disposed on a portion in which an interface between the closed cross-sectional portion 110 and the connection bonding portion 200 is formed may be bonded by welding at the interface.

As illustrated in FIGS. 5A and 6A, the first connection bonding portion 210 may be bonded by welding to the first closed cross-sectional portion 111 disposed closest to the first connection bonding portion 210, while the second connection bonding portion 230 may be bonded by welding to the second closed cross-sectional portion 112 disposed closest to the second connection bonding portion 230.

Structural strength of the pillar member 10 may be secured by forming a welding portion W at only two points. Thus, the amount of welding to form the pillar member 10 may be reduced, thereby reducing the manufacturing expenses of the pillar member 10 and securing sufficient strength thereof.

As illustrated in FIG. 6B, the first connection bonding portion 210 may be bonded by welding to the first closed cross-sectional portion 111 disposed closest to the first connection bonding portion 210, while the second connection bonding portion 230 may be bonded by welding to the fourth closed cross-sectional portion 114 disposed closest to the second connection bonding portion 230.

At least the pillar body portion 100 between the pillar body portion 100 and the connection bonding portion 200 may be configured using a material selected from among martensitic steel, complex phase (CP) steel, dual phase (DP) steel, transformation induced plasticity (TRIP) steel, and twinning induced plasticity (TWIP) steel, having strength of 980 MPa or higher.

As illustrated in FIG. 4, the connection bonding portion 200 may be formed on a portion of opposing side surfaces of the pillar body portion 100 in a length direction.

In a case in which the closed cross-sectional portion 110 forming the pillar body portion 100 and the connection bonding portion 200 are bonded by welding, an entirety of the connection bonding portion 200 is not required to be combined with the vehicle frame 1. Thus, the connection bonding portion 200 may not be formed on an entirety of sides of the pillar body portion 100 in a length direction thereof, but formed on a portion of sides thereof in the length direction.

Thus, the usage of steel used to form the connection bonding portion 200 is reduced, and the amount of welding to combine the vehicle frame 1 and a connection bonding portion is minimized, thereby reducing the manufacturing expenses of the pillar member 10 of a vehicle.

As illustrated in FIG. 1, the pillar body portion 100 and the connection bonding portion 200 may be formed at an interface between a windshield and a side window of the vehicle frame 1 in a length direction.

The pillar body portion 100 and the connection bonding portion 200 may be cast using a roll bending process, thereby forming a curvature in the length direction.

As illustrated in FIG. 1, in a case in which a predetermined curvature is required to be set in a length direction in the same manner as the pillar member 10 disposed between the windshield and the side window of the vehicle frame 1, the pillar body portion 100 and the connection bonding portion 200 are consecutively cast using a single roll forming process to manufacture the pillar member 10, and then the pillar member 10 that has been manufactured may be cast using the roll bending process to have a predetermined curvature in the length direction.

Hereinafter, with reference to FIGS. 7A to 7C, a pillar member 10 of the related art illustrated in FIG. 2 and a pillar member 10 of the present disclosure illustrated in FIG. 5 will be compared, to be described.

First, FIG. 7A is a view contrasting a cross section of the pillar member 10 combined with a vehicle frame 1 of the related art illustrated in FIG. 2 and a cross section of the pillar member 10 combined with a vehicle frame 1 of the present disclosure illustrated in FIG. 5.

FIG. 7B is a view contrasting a disposition area of the pillar member 10 combined with the vehicle frame 1 of the related art illustrated in FIG. 2 and a disposition area of the pillar member 10 combined with the vehicle frame 1 of the present disclosure illustrated in FIG. 5.

FIG. 7C is a view contrasting the cross section of the pillar member 10 of the vehicle of the related art illustrated in FIG. 2 and the cross section of the pillar member 10 of the vehicle of the present disclosure illustrated in FIG. 5.

As such, as illustrated in FIG. 7C, in the case of the pillar member 10 according to an exemplary embodiment illustrated in FIG. 5, an area of a cross section thereof is significantly reduced as compared with that of a cross section of the pillar member 10 of the related art illustrated in FIG. 2, so that the pillar member 10 forming a structural member of a vehicle may secure sufficient load bearing performance, and the area of a cross section of the pillar member 10 is decreased. Thus, manufacturing expenses of the pillar member 10 may be decreased. In addition, driver visibility may be sufficiently secured.

With reference to FIG. 7B, it can be confirmed that a first area S1, a disposition area, including the pillar member 10 according to an exemplary embodiment illustrated in FIG. 5 and including an outer panel forming the vehicle frame 1 of a vehicle is significantly different from a second area S2, a disposition area, including the pillar member 10 of the related art illustrated in FIG. 2 and an outer panel, in terms of a cross section.

Hereinafter, a roll formed member 20 according to an exemplary embodiment in the present disclosure will be described in detail with reference to the attached drawings.

With reference to FIG. 9, the roll formed member 20 according to an exemplary embodiment may include a roll formed body portion 300 and a connection bonding portion 400.

As illustrated in FIG. 9, the roll formed member 20 may include the roll formed body portion 300 forming at least one closed cross-sectional portion 310 and the connection bonding portion 400 disposed on at least one side of the roll formed body portion 300 and combined with a structural member 5. The roll formed body portion 300 and the connection bonding portion 400 may be consecutively cast.

The connection bonding portion 400 may be formed on opposing side surfaces of the roll formed body portion 300. In this case, the structural member 5 may be disposed on the opposing side surfaces of the roll formed body portion 300 by the medium of the connection bonding portion 400.

In addition, the connection bonding portion 400 may be formed on a side of the roll formed body portion 300. In this case, the structural member 5 may only be disposed on the side of the roll formed body portion 300.

The roll formed body portion 300 and the connection bonding portion 400 forming the roll formed member 20 may be cast to be a member having a desired form in such a manner that a steel plate is folded by a roll forming device to have a multistage cross section.

As illustrated in FIGS. 9 and 10, the roll formed body portion 300 and the connection bonding portion 400 may be consecutively cast using the single roll forming process.

In FIG. 10, in a state in which opposing sides of a panel, such as a steel plate, or the like, forming the roll formed body portion 300 and the connection bonding portion 400 are cut in advance, and the connection bonding portion 400 is partially formed, the roll formed member 20 and the connection bonding portion 400 may be consecutively cast using the single roll forming process.

Without disconnection in the steel plate, a first connection bonding portion 410, the roll formed body portion 300, and a second connection bonding portion 430 are sequentially roll formed, thereby consecutively being cast using the single roll forming process.

A roll forming process allows for a relatively high degree of size precision and causes substantially no scrapping and wear of a roll, thereby significantly economically manufacturing products having a uniform cross section shape and having a relatively long length.

The roll forming process is a technology in which whenever a set of upper and lower multistage stationary rotating rolls is arranged, and a coil or a material that has been cut passes between each set of rotating rolls, a component is gradually cast to have a form in which a cross section thereof is uniform and a length thereof is relatively long.

In detail, since ultra-high strength steel may also be cast using the roll forming process, the roll forming process is suitable to manufacture a high strength steel component of a vehicle.

As illustrated in FIGS. 9 and 10, the connection bonding portion 400 may include the first connection bonding portion 410 and the second connection bonding portion 430.

The connection bonding portion 400 may include the first connection bonding portion 410 disposed on one side of the roll formed body portion 300 and the second connection bonding portion 430 disposed on the other side of the roll formed body portion 300 to oppose the first connection bonding portion 410.

The roll formed body portion 300 may be consecutively cast in a section between the first connection bonding portion 410 and the second connection bonding portion 430 using a roll forming method, thereby forming an even number of closed cross-sectional portions 310.

In this case, the closed cross-sectional portion 310 may be consecutively formed, while closed cross-sectional portions disposed adjacent to each other may be formed to be in contact with each other.

The closed cross-sectional portion 310 foitued in the roll formed body portion 300 may be provided as an even number of closed cross-sectional portions, so that the roll formed body portion 300 and the connection bonding portion 400 may be integrally cast using the single roll forming process.

As illustrated in FIGS. 11 to 12, in order that the roll formed body portion 300 and the connection bonding portion 400 are integrally roll formed, and the connection bonding portion 400 is formed on the opposing side surfaces of the roll formed body portion 300, the closed cross-sectional portion 310 may be provided as an even number of closed cross-sectional portions.

In a case in which an odd number of closed cross-sectional portions 310 are consecutively formed in the roll formed body portion 300, the connection bonding portions 400 may not be formed on opposing side surfaces of the roll formed body portion 300 to oppose each other, and may be formed in the same direction.

Thus, in order that two connection bonding portions 400 opposing each other to be combined with the structural member 5 are formed in the roll formed body portion 300, and the connection bonding portion 400 and the roll formed body portion 300 are integrally cast using the single roll forming process, the closed cross-sectional portion 310 may be provided as an even number of closed cross-sectional portions.

The roll formed member 20 according to an exemplary embodiment may form the roll formed body portion 300 having a closed cross-sectional structure. The connection bonding portions 400 opposing each other to be connected to the structural member 5 on opposing side surfaces of the roll formed body portion 300 may be cast using the single roll forming process.

Thus, the roll formed member 20 according to an exemplary embodiment may improve load bearing performance by having a closed cross-sectional structure, may increase a production rate of the roll formed member 20 by reducing an amount of welding, and may reduce manufacturing expenses of the roll formed member 20 due to a reduction in the amount of welding.

In addition, in the case of the roll formed member 20 according to an exemplary embodiment, manufacturing expenses may be reduced, and the structural member 5 may be easily combined therewith by minimizing usage of a steel plate used to manufacture the roll formed member 20, in such a manner that the closed cross-sectional structure to improve load bearing performance is formed, and the connection bonding portions 400 opposing each other are formed on the opposing side surfaces of the roll formed body portion 300.

The roll formed body portion 300 may have a FIG. 8 type cross section in which two closed cross-sectional portions 310 are consecutively formed using the roll forming method.

As illustrated in FIG. 11A, the roll formed body portion 300 may be consecutively cast in the section between the first connection bonding portion 410 and the second connection bonding portion 430 using the roll forming method, thereby including a first closed cross-sectional portion 311 and a second closed cross-sectional portion 312, having the FIG. 8 type cross section.

As illustrated in FIG. 11A, in order to bond the first connection bonding portion 410, the roll formed body portion 300, and the second connection bonding portion 430, consecutively roll formed, the first connection bonding portion 410, the roll formed body portion 300, and the second connection bonding portion 430 may be bonded by welding at two points.

As such, the roll formed body portion 300 having a multiple-closed cross-sectional structure including two or more closed cross-sectional portions 310 may be formed, and the connection bonding portions 400 opposing each other may be formed on the opposing side surfaces of the roll formed body portion 300 in such a manner that, in order to bond the first connection bonding portion 410, the roll formed body portion 300, and the second connection bonding portion 430, consecutively roll formed, the first connection bonding portion 410, the roll formed body portion 300, and the second connection bonding portion 430 are bonded by welding at two points.

Thus, the roll formed member 20 according to an exemplary embodiment may improve load bearing performance by having the multiple-closed cross-sectional structure, may increase a production rate of the roll formed member 20 by reducing the amount of welding, and may reduce the manufacturing expenses of the roll formed member 20 due to the reduction in the amount of welding.

In addition, in the case of the roll formed member 20 according to an exemplary embodiment, the manufacturing expenses may be reduced, and the structural member 5 may be easily combined therewith by minimizing the usage of the steel plate used to manufacture the roll formed member 20, in such a manner that the closed cross-sectional structure to improve load bearing performance is formed, and the connection bonding portions 400 opposing each other are formed on the opposing side surfaces of the roll formed body portion 300.

As illustrated in FIGS. 11 and 12, the roll formed body portion 300 may include a first body portion panel 330, a second body portion panel 350, the first closed cross-sectional portion 311, and the second closed cross-sectional portion 312.

The connection bonding portion 400 may include the first connection bonding portion 410 provided on one side surface of the roll formed body portion 300 and the second connection bonding portion 430 provided on the other side surface of the roll formed body portion 300. The roll formed body portion 300 may include the first body portion panel 330 formed to be extended from the first connection bonding portion 410, the second body portion panel 350 formed to be extended from the second connection bonding portion 430, the first closed cross-sectional portion 311 connected to the first body portion panel 330 and consecutively roll formed, and the second closed cross-sectional portion 312 having one side connected to the first closed cross-sectional portion 311 and the other side connected to the second body portion panel 350 and consecutively roll formed.

The first closed cross-sectional portion 311 and the second closed cross-sectional portion 312 may be formed between the first body portion panel 330 and the second body portion panel 350 to be connected thereto and may be consecutively roll formed.

The roll formed body portion 300 may form the multiple-closed cross-sectional structure including a plurality of closed cross-sectional portions 310 formed to have a triangular cross-sectional shape or a quadrangular cross-sectional shape.

As illustrated in FIG. 11, the first closed cross-sectional portion 311 and the second closed cross-sectional portion 312 may be formed to have a quadrangular cross-sectional shape, corners of which may have a predetermined curvature.

As illustrated in FIG. 12A, the first closed cross-sectional portion 311 and the second closed cross-sectional portion 312 may be formed to have a triangular cross-sectional shape, corners of which may have a predetermined curvature.

However, a shape of the closed cross-sectional portion 310 is not limited to a triangle and a quadrangle. The closed cross-sectional portion 310 may have any type of polygonal cross section that may improve load bearing performance of the roll formed member 20.

As illustrated in FIG. 12B, the first closed cross-sectional portion 311, the second closed cross-sectional portion 312, a third closed cross-sectional portion 313, and a fourth closed cross-sectional portion 314 may be formed to have a quadrangular cross-sectional shape, corners of which may have a predetermined curvature.

In FIG. 12A, two closed cross-sectional portions 310 are formed, while, in FIG. 12B, four closed cross-sectional portions 310 are formed. FIG. 12A and FIG. 12B have a difference in load bearing performance of the roll formed member 20 and manufacturing expenses depending on usage of steel, or the like.

FIG. 12A illustrates a form of an optimum roll formed member 20, according to an exemplary embodiment, securing sufficient load bearing performance by forming the multiple-closed cross-sectional structure including two closed cross-sectional portions 310 and reducing the manufacturing expenses of the roll formed member 20 by minimizing the usage of steel and the amount of welding.

In the meantime, in FIG. 12B, the multiple-closed cross-sectional structure is formed by forming four closed cross-sectional portions 310, thereby increasing manufacturing expenses, as compared with the case in FIG. 12A, due to an increase in the usage of steel, but load bearing performance is improved.

In the case of FIG. 12B, there is substantially no change in areas of cross sections of the roll formed member 20 and the structural member 5.

Thus, the roll formed member 20 illustrated in FIG. 12B may be applied to a connection portion of the structural member 5 requiring sufficient load bearing performance.

As illustrated in FIG. 11B, in the case of the roll formed member 20, at least nine portions among portions in which a body portion panel overlaps a member forming the closed cross-sectional portion 310 may be lap welded.

A portion in which the first body portion panel 330 overlaps a member of the second closed cross-sectional portion 312 and a portion in which the second body portion panel 350 overlaps the first closed cross-sectional portion 311 may be lap welded.

As illustrated in FIGS. 11A, 12A, and 12B, the connection bonding portion 400 may be bonded by welding to the closed cross-sectional portion 310 disposed closest to the connection bonding portion 400. In other words, the closed cross-sectional portion 310 disposed in a portion in which the interface is formed between the connection bonding portion 400 and the closed cross-sectional portion 310 may be bonded by welding at the interface.

As illustrated in FIGS. 11A and 12A, the first connection bonding portion 410 maybe bonded by welding to the first closed cross-sectional portion 311 disposed closest to the first connection bonding portion 410, while the second connection bonding portion 430 maybe bonded by welding to the second closed cross-sectional portion 312 disposed closest to the second connection bonding portion 430.

Structural strength of the roll formed member 20 may be secured by forming a welding portion W at only two points. Thus, the amount of welding to form the roll formed member 20 may be reduced, thereby reducing the manufacturing expenses of the roll formed member 20 and securing sufficient strength thereof.

As illustrated in FIG. 12B, the first connection bonding portion 410 maybe bonded by welding to the first closed cross-sectional portion 311 disposed closest to the first connection bonding portion 410, while the second connection bonding portion 430 maybe bonded by welding to the fourth closed cross-sectional portion 314 disposed closest to the second connection bonding portion 430.

At least the roll formed body portion 300 between the roll formed body portion 300 and the connection bonding portion 400 may be configured using a material selected from among martensitic steel, CP steel, DP steel, TRIP steel, and TWIP steel, having strength of 980 MPa or higher.

As illustrated in FIG. 10, the connection bonding portion 400 may be formed on a portion of opposing side surfaces of the roll formed body portion 300 in a length direction.

In a case in which the interface between the closed cross-sectional portion 310 forming the roll formed body portion 300 and the connection bonding portion 400 is bonded by welding, an entirety of the connection bonding portion 400 is not required to be combined with the structural member 5. Thus, the connection bonding portion 400 may not be formed in an entirety of side surfaces of the roll formed body portion 300 in a length direction, but formed on a portion thereof in the length direction.

Thus, the usage of steel used to form the connection bonding portion 400 is reduced, and the amount of welding to combine the structural member 5 and a connection bonding portion is minimized, thereby reducing the manufacturing expenses of the roll formed member 20.

As illustrated in FIG. 10, the roll formed body portion 300 and the connection bonding portion 400 may be formed at an interface of the structural member 5 in a length direction.

The roll formed body portion 300 and the connection bonding portion 400 may be cast using a roll bending process, thereby forming a curvature in the length direction.

In a case in which a predetermined curvature is required to be set in a length direction in the same manner as the roll formed member 20 disposed to be bonded to the structural member 5, the roll formed body portion 300 and the connection bonding portion 400 are consecutively cast using the single roll forming process to manufacture the roll formed member 20, and then the roll formed member 20 that has been manufactured may be cast to have the a predetermined curvature in the length direction using the roll bending process.

Hereinafter, with reference to FIG. 14, a roll formed member 20 of the related art illustrated in FIG. 8 and a roll formed member 20 of the present disclosure will be compared to be described.

First, FIG. 14A is a view contrasting a cross section of the roll formed member 20 combined with a structural member 5 of the related art illustrated in FIG. 8 and a cross section of the roll formed member 20 combined with a structural member 5 of the present disclosure illustrated in FIG. 11.

FIG. 14 is a view contrasting the cross section of the roll formed member 20 of the related art illustrated in FIG. 8 and the cross section of the roll formed member 20 of the present disclosure illustrated in FIG. 11.

As such, as illustrated in FIG. 14, in the case of the roll formed member 20 according to an exemplary embodiment illustrated in FIG. 12, an area of a cross section thereof is significantly reduced as compared with that of a cross section of the roll formed member 20 of the related art illustrated in FIG. 8, so that the roll formed member 20 disposed in a bonding portion of the structural member 5 may secure sufficient load bearing performance, and the area of a cross section of the roll formed member 20 is decreased. Thus, manufacturing expenses of the roll formed member 20 may be decreased.

With reference to FIG. 14, it can be confirmed that a first area S1, a disposition area of the roll formed member 20 according to an exemplary embodiment illustrated in FIG. 11 is significantly different from a second area S2, a disposition area of the roll formed member 20 of the related art illustrated in FIG. 8, in terms of a cross section.

As illustrated in FIG. 15, a pillar body portion 300 may include a first body portion panel 330, a second body portion panel 350, a first closed cross-sectional portion 311, and a second closed cross-sectional portion 312.

In the case of the roll formed member 20, the first body portion panel 350 is extended from the second connection bonding portion 430 to be formed, an end portion of the second body portion panel 350 is bent, the second closed cross-sectional portion 312 and the first closed cross section 311 are consecutively formed. In addition, the first body portion panel 330 is formed after the first closed cross-sectional portion 311 and the second closed cross-sectional portion 312 are formed, and then the first connection bonding portion 410 may be formed after being bent at 90° while being extended in a direction of the first body portion panel 330 along a side surface of the second closed cross-sectional portion 312.

FIGS. 16 to 19 are views of a roll formed member of the present disclosure having various exemplary embodiments.

With reference to FIGS. 16 and 17, a roll formed body portion 300 may form a multiple-closed cross-sectional structure including a plurality of closed cross-sectional portions 310, at least a portion of corners of which are formed to have an arc form.

An even number of closed cross-sectional portions 310 are consecutively formed in the roll formed body portion 300, while at least a portion of corners of respective closed cross-sectional portions 310 may be provided to have a curved shape.

In this case, three corners among four corners of respective closed cross-sectional portions 310 are formed to be curved, while each of curved corners may be roll formed to have the arc shape.

With reference to FIG. 16, in the case of the closed cross-sectional portion 310 formed in the roll formed body portion 300, two closed cross-sectional portions 310 are consecutively formed. Each of the two closed cross-sectional portions 310 may include a FIG. 8 type cross section having a curved shape.

As illustrated in FIG. 17A, the FIG. 8 type cross section including the two closed cross-sectional portions 310 may be consecutively formed in a horizontal direction, or maybe consecutively formed in a vertical direction to form the roll formed body portion 300 as illustrated in FIG. 17B.

As such, depending on a level and a direction of load on a roll formed member 20, the closed cross-sectional portions 310 maybe formed to be overlapped, thereby improving load bearing performance.

With reference to FIGS. 18 and 19, the roll formed body portion 300 may form the multiple-closed cross-sectional structure including a plurality of closed cross-sectional portions 310 formed to have a quadrangular cross-sectional shape.

With reference to FIGS. 18 and 19, an even number of closed cross-sectional portions 310 may be consecutively formed in the roll formed body portion 300. At least a portion of corners of respective closed cross-sectional portions 310 may be provided to have an angular shape.

In this case, respective closed cross-sectional portions 310 may be roll formed to have a quadrangular cross-sectional shape, four corners of which are formed to be angular.

As illustrated in FIG. 19A, the FIG. 8 type cross section including the two closed cross-sectional portions 310 may be consecutively formed in the horizontal direction, or may be consecutively formed in the vertical direction to form the roll formed body portion 300 as illustrated in FIG. 19B.

However, the closed cross-sectional portion 310 may have any type of polygonal cross section that may improve load bearing performance of the roll formed member 20.

The roll formed member 20 may be configured to improve structural performance supporting load in a connection portion of various structural members 5.

In detail, the roll formed member 20 may be applied to various products, such as an impact carrier, a bumper, a frame, a pillar member, or the like, improving structural performance of a vehicle.

While exemplary embodiments have been shown and described above, it will be apparent to those skilled in the art that modifications and variations could be made without departing from the scope of the present invention as defined by the appended claims.

The invention claimed is:

1. A pillar member of a vehicle, comprising:
   a pillar body portion having at least one closed cross-sectional portion; and
   a connection bonding portion disposed on opposing side surfaces of the pillar body portion and consecutively cast to be connected to the pillar body portion, in order to be combined with a vehicle frame,
   wherein the connection bonding portion includes a first connection bonding portion disposed on one side of the pillar body portion and a second connection bonding portion disposed on the other side of the pillar body portion to oppose the first connection bonding portion, and the pillar body portion is consecutively cast using a roll forming method in a section between the first connection bonding portion and the second connection bonding portion, thereby forming an even number of closed cross-sectional portions,
   wherein at least the pillar body portion between the pillar body portion and the connection bonding portion is made of a material selected from among martensitic steel, complex phase (CP) steel, dual phase (DP) steel, transformation induced plasticity (TRIP) steel, and twinning induced plasticity (TWIP) steel, having strength of 980 MPa or higher, and
   wherein the connection bonding portion is disposed on a portion of the opposing side surfaces of the pillar body portion in a length direction of the pillar body portion.

2. The pillar member of a vehicle of claim 1, wherein the pillar body portion is consecutively cast using a roll forming method in a section between the first connection bonding portion and the second connection bonding portion to include a first closed cross-sectional portion and a second closed cross-sectional portion, having a figure-8 type cross section.

3. The pillar member of a vehicle of claim 1, wherein the pillar body portion includes a first body portion panel formed to be extended from the first connection bonding portion; a second body portion panel formed to be extended from the second connection bonding portion; a first closed cross-sectional portion connected to the first body portion panel and consecutively roll formed; and a second closed cross-sectional portion having one side connected to the first closed cross-sectional portion and the other side connected to the second body portion panel to be consecutively roll formed.

4. The pillar member of a vehicle of claim 3, wherein among portions of the first body portion panel and the second body portion panel overlapping a member forming the first closed cross-sectional portion and the second closed cross-sectional portion, at least two portions are lap welded.

5. The pillar member of a vehicle of claim 1, wherein the connection bonding portion is welded to the at least one closed cross-sectional portion disposed closest to the connection bonding portion.

6. The pillar member of a vehicle of claim 1,
   wherein the pillar body portion and the connection bonding portion are consecutively cast using a single roll forming process.

7. The pillar member of a vehicle of claim 1, wherein the pillar body portion has a multiple-closed cross-sectional structure including a plurality of closed cross-sectional portions formed to have a triangular cross-sectional shape or a quadrangular cross-sectional shape.

8. The pillar member of a vehicle of claim 1, wherein the pillar body portion and the connection bonding portion are formed at an interface between a windshield and a side window of the vehicle frame in the length direction.

9. A roll formed member, comprising:
   a roll formed body portion having at least one closed cross-sectional portion; and
   a connection bonding portion disposed on at least one side of the roll formed body portion and combined with a structural member,
   wherein the roll formed body portion and the connection bonding portion are integrally cast using a roll forming method,
   wherein the connection bonding portion comprises a first connection bonding portion disposed on one side of the roll formed body portion and a second connection bonding portion disposed on the other side of the roll formed body portion to oppose the first connection bonding portion,
   wherein the roll formed body portion is consecutively cast in a section between the first connection bonding portion and the second connection bonding portion using the roll forming method, in order to form an even number of closed cross-sectional portions, wherein at least the roll formed body portion between the roll formed body portion and the connection bonding portion is made of a material selected from among martensitic steel, CP steel, DP steel, TRIP steel, and TWIP steel, having strength of 980 MPa or higher, and wherein the connection bonding portion is disposed on a portion of opposing side surfaces of the roll formed body portion in a length direction of the pillar body portion.

10. The roll formed member of claim 9, wherein the roll formed body portion is consecutively cast in a section between the first connection bonding portion and the second connection bonding portion using the roll forming method, in order to provide a first closed cross-sectional portion and a second closed cross-sectional portion, having a figure-8 type cross section.

11. The roll formed member of claim 9, wherein the roll formed body portion comprises a first body portion panel formed to be extended from the first connection bonding portion; a second body portion panel formed to be extended from the second connection bonding portion; a first closed cross-sectional portion connected to the first body portion panel and consecutively roll formed; and a second closed cross-sectional portion having one side connected to the first closed cross-sectional portion and the other side connected to the second body portion panel and consecutively roll formed.

12. The roll formed member of claim 11, wherein among portions of the first body portion panel and the second body portion panel overlapping a member forming the first closed cross-sectional portion and the second closed cross-sectional portion, at least two portions are lap welded.

13. The roll formed member of claim 9, wherein the connection bonding portion is welded to the at least one closed cross-sectional portion disposed closest to the connection bonding portion.

14. The roll formed member of claim 9, wherein the roll formed body portion has a multiple-closed cross-sectional structure including a plurality of closed cross-sectional portions formed to have a triangular cross-sectional shape or a quadrangular cross-sectional shape.

15. The pillar member of a vehicle of claim 1, wherein the connection bonding portion is not disposed on an entire side of the opposing side surfaces of the pillar body portion in the length direction.

16. The pillar member of a vehicle of claim 1, wherein the connection bonding portion is divided to a plurality of connection bonding portions having a gap in the length direction between adjacent connection bonding portions among the plurality of connection bonding portions.

* * * * *